United States Patent [19]

Tawakol

[11] 4,015,818
[45] Apr. 5, 1977

[54] VALVE WITH SELF-RETAINING VALVE SEAT

[75] Inventor: A. Assem Tawakol, Elmira, N.Y.

[73] Assignee: International Telephone and Telegraph Corporation, Nutley, N.J.

[22] Filed: July 23, 1975

[21] Appl. No.: 598,320

[52] U.S. Cl. .............................. 251/307; 251/173; 251/317; 251/362; 277/164

[51] Int. Cl.$^2$ ........................................... F16K 1/22

[58] Field of Search .......... 251/172, 173, 306, 307, 251/315, 317, 362; 277/171, 164

[56] References Cited

UNITED STATES PATENTS

| | | | |
|---|---|---|---|
| 1,977,351 | 10/1934 | Phillips | 251/306 |
| 2,991,043 | 7/1961 | Saar | 251/306 |
| 3,051,435 | 8/1962 | Ramsey | 251/306 |
| 3,079,123 | 2/1963 | Freemoutle | 251/306 |
| 3,540,696 | 11/1970 | Fawkes | 251/306 |
| 3,866,925 | 2/1975 | Maimstrom | 277/164 |

Primary Examiner—Harold W. Weakley
Attorney, Agent, or Firm—John T. O'Halloran; Peter C. Van Der Sluys

[57] ABSTRACT

A valve body has a closing member rotatably mounted in a passage for opening and closing said passage. An annular groove having a substantially dove-tailed cross sectional portion is formed in said valve body for receiving an elastomeric annular seal ring. Said groove is positioned so that the seal ring is engaged by the periphery of the closing member when said closing member is in the closed position. The annular seal ring includes a pair of annular axially extending arms disposed on each side of said seal ring and an annular spring member embedded in said seal ring and extending into the axially extending arms so that when the seal ring is disposed in the groove the spring member forces said arms into engagement with the dove-tailed portion of the groove thereby rendering the seal ring self-retaining. The seal ring and groove are formed so that a space is provided between the arms and the main portion of the seal for trapping pressurized fluid that leaks passed the seal, said fluid exerting additional sealing pressure on the arms.

15 Claims, 6 Drawing Figures

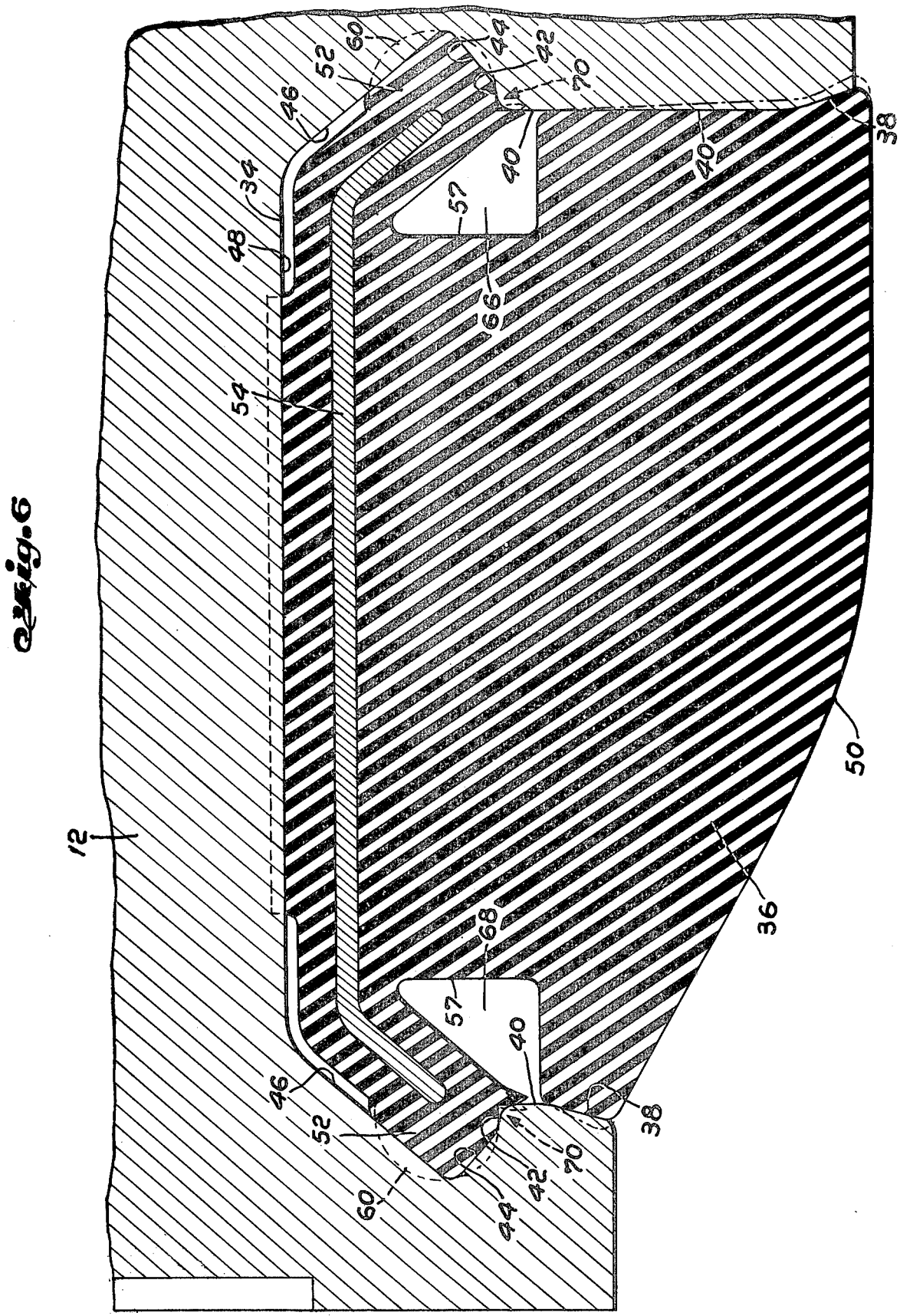

VALVE WITH SELF-RETAINING VALVE SEAT

BACKGROUND OF THE INVENTION

1. Field of the Invention

The present invention relates to pivot valves and more particularly to replaceable seal rings for said valves.

2. Description of the Prior Art

Heretofore, butterfly and ball valves have not been available with conveniently replaceable seal rings that meet all of the required operating characteristics for high performance butterfly and ball valves. The seal rings for these pivot type valves have been retained by many and varied means. The most common method of retaining a seal ring in a valve body is to bond the seal ring in an annular groove; however, the bonding made replacement of the seal ring an extremely laborious operation because of the difficulty encountered in removing all of the bonded seal ring from the annular groove. Replaceable seal rings have been provided using various forms of rigid or flexible retaining rings or threaded fasteners; however, these devices proved to be expensive and inconvenient. In some devices, the valve body itself was divided into two parts that would engage and retain the seal ring when connected.

SUMMARY OF THE INVENTION

The present invention contemplates a pivot type valve such as a disc or ball valve having a replaceable seal ring that may be snapped into position. The seal ring is both self-retaining and self sealing thereby eliminating the need for bonding or separate fastening means.

Many of the advantages of the present invention are provided by using an annular groove in the valve body with side walls constructed to have a portion that diverges in dove-tailed fashion. The annular seal ring includes a pair of axially extending annular arms and an annular spring member embedded therein for urging the arms in an axial direction. When the seal ring is pressed into the annular groove the arms are spread into the dove-tailed portion thereby retaining the seal ring in said groove.

The primary objective of the present invention is to provide a pivot type valve having a self-retaining replaceable seal ring.

Another objective of the present invention is to provide a pivot type valve having a self-sealing ring. Another objective of the present invention is to provide a pivot type valve having a self-leaking seal ring.

Another objective of the present invention is to provide a pivot type valve having a seal ring that may be easily removed and replaced in the field without the need for additional retaining means.

The above and other objectives and advantages of the present invention will become apparent from the following detailed description and the drawings in which two embodiments are described.

BRIEF DESCRIPTION OF THE DRAWINGS

FIG. 6 is a cross sectional view of a portion of a valve body showing another embodiment of a seal ring and groove.

DESCRIPTION OF THE PREFERRED EMBODIMENT

Figure 1:
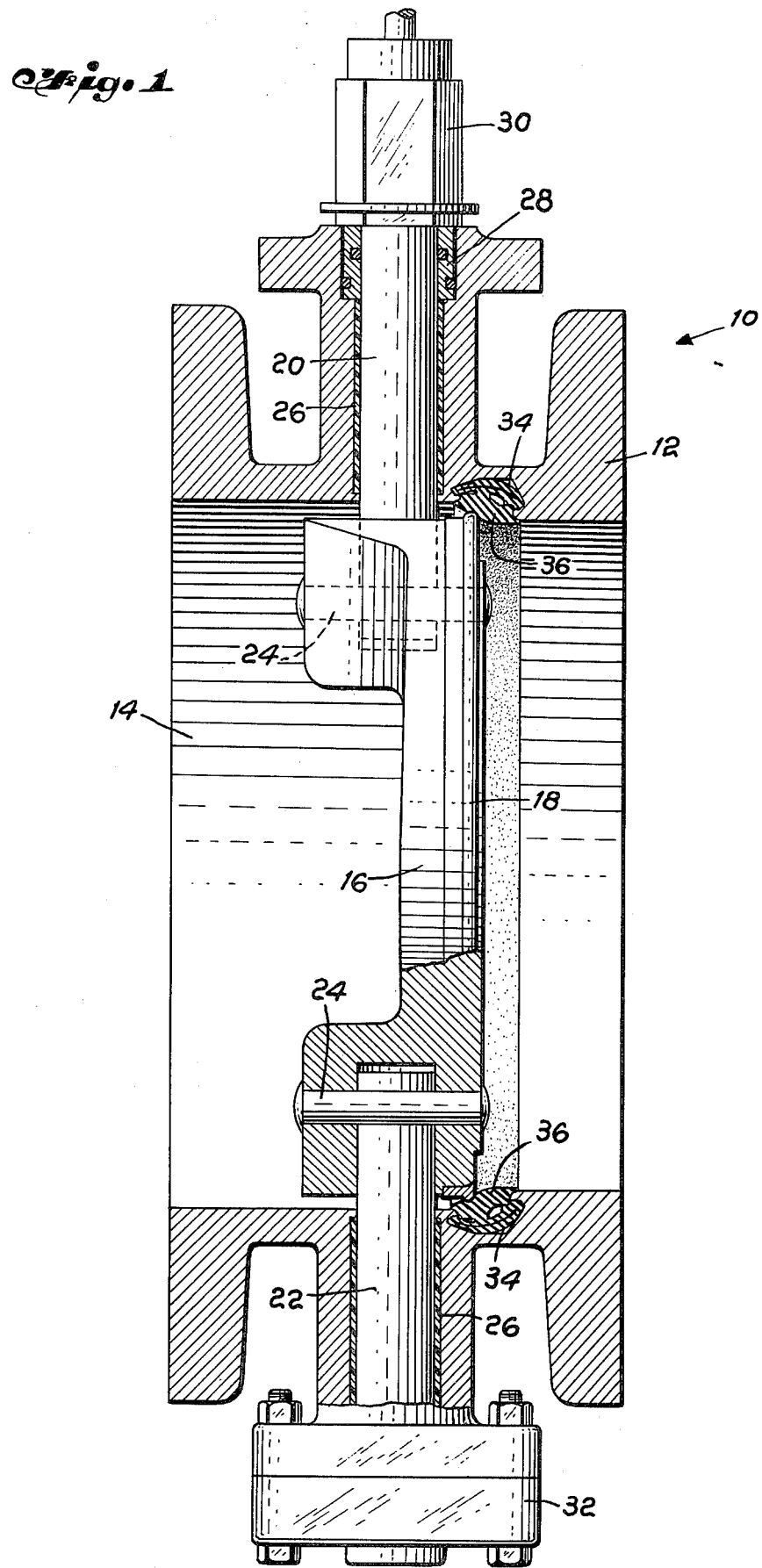
FIG. 1 is a vertical section of a butterfly valve constructed in accordance with the present invention.

Referring to FIG. 1, there is shown a butterfly valve 10 having a generally cylindrical body 12 with a cylindrical passage or valve bore 14 formed therein. A closing member in the form of a valve disc 16 is mounted in the passage and has a circular shape for closing and opening said passage. A stainless steel disc ring 18 is formed about the periphery of the valve disc for forming a smooth corrosion resistant sealing surface. The valve disc is mounted to upper and lower shaft members 20 and 22 respectively by stainless steel pins 24. The upper and lower shaft members extend radially through the valve body 12 and are mounted for rotation therein by nylon bearings 26. Seal cartridges 28 including O-rings are disposed about the upper and lower shaft members for providing seals between the shaft members and the valve body. The upper shaft member terminates in a hex-driver 30 while the lower shaft terminates at a bottom cover 32 which may include a thrust washer. An annular groove 34 is formed in the valve body about the valve passage for receiving a seal ring 36. Seal ring 36 and disc ring 18 have opposed surfaces which engage each other to provide a seal when the valve disc is in the closed position.

Figure 2:
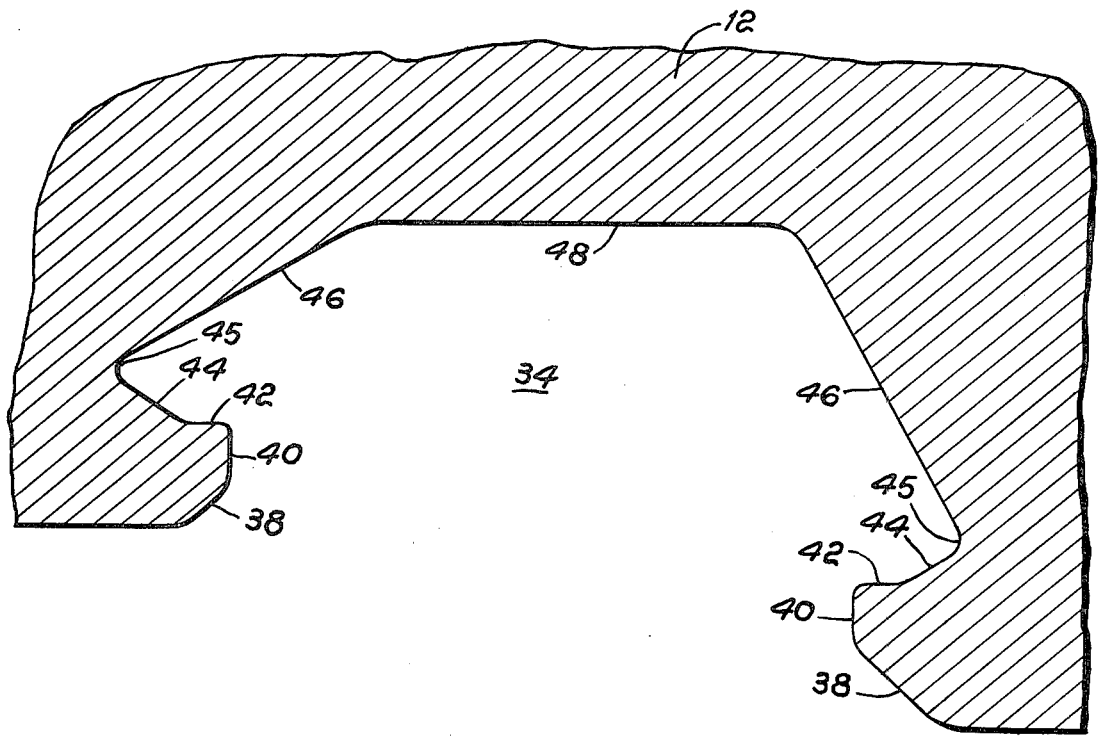
FIG. 2 is a cross sectional view of a portion of a valve body showing an annular groove for receiving a seal ring constructed in accordance with the present invention.

Referring to FIG. 2, there is shown a detailed cross section of a portion of the valve body 12 including the annular groove 34. The annular groove 34 is defined by a plurality of surfaces as follows: a pair of inwardly directed converging surfaces 38 which merge into a pair of parallel surface 40. Parallel surfaces 40 terminate at rounded corners formed with a pair of cylindrical surfaces 42. The cylindrical surfaces 42 merge into a pair of diverging surfaces 44, which form a dove-tailed portion, and terminate at the widest part of the groove in rounded corners 45 formed with a pair of inner converging surfaces 46 which are connected at their inner most ends by a cylindrical surface 48. Thus, groove 34 has an inner portion having a width between corners 45 that is wider than an outer portion between surfaces 40.

Figure 3:
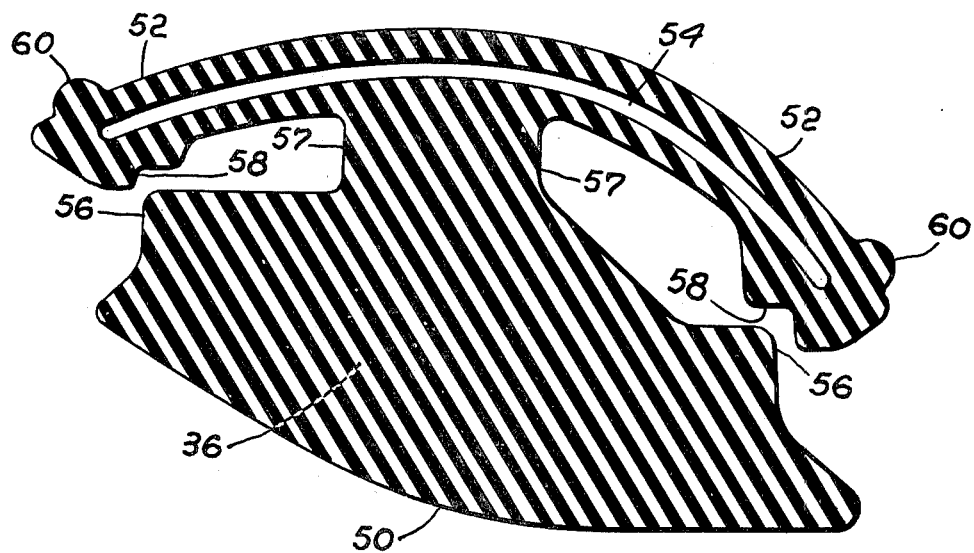
FIG. 3 is a cross sectional view showing a seal ring adapted to be inserted in the groove shown in FIG. 2.

Referring to FIG. 3, there is shown a detailed cross section of the annular sealing ring 36 which is adapted to fit into the annular groove 34. Annular seal ring 36 includes a curved sealing surface 50 for engaging the disc ring 18 and a pair of axially extending arms 52 extending from each side of the seal ring for engaging the surfaces of the groove at the wider inner portion of the groove. An annular spring member 54 is embedded in the seal ring and extends into the arms 52. The spring member has a curved cross sectional shape with the ends turning towards sealing surface 50. The sides of the seal ring 36 include step portions 56 and recessed portions 57 from which arms 52 extend. The axially extending arms 52 have complementary stepped portions 58 formed thereon for mating with portions 56. A pair of sealing beads 60 are formed adjacent the ends of the arms 52 on the outer side of said arms.

The annular seal ring 36 is formed of an elastomeric material such as Buna-N which may be either extruded or molded. If extruded as a continuous member, predetermined lengths may be cut and the ends connected and vulcanized together to form the annular seal ring. The spring member 54 is embedded in the elastomeric material and may be formed from a thin sheet of spring metal or woven wire and cord as shown in FIG. 4.

Figure 4:
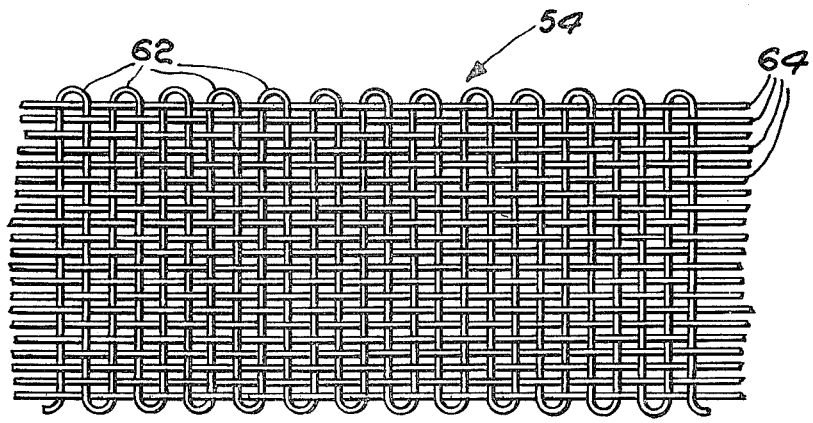
FIG. 4 shows an embodiment of a spring member that may be used in the seal ring of FIG. 3.

Referring to FIG. 4, there is shown how the metallic spring member 54 may be formed using a continuous length of spring steel wire 62 which is folded back and forth to form a strip having a width slightly less than the width of the seal ring. Preferably, the wire has a diameter of 0.019 inch; however, it has been determined that other diameters such as 0.016 and 0.024 inch are satisfactory. The wire should be folded so that it crosses the seal ring approximately 10 times per inch. Nylon cord 64 is woven between the folded spring steel wire and extends annularly about the sealed ring to maintain the proper configuration for the spring member.

Figure 5:
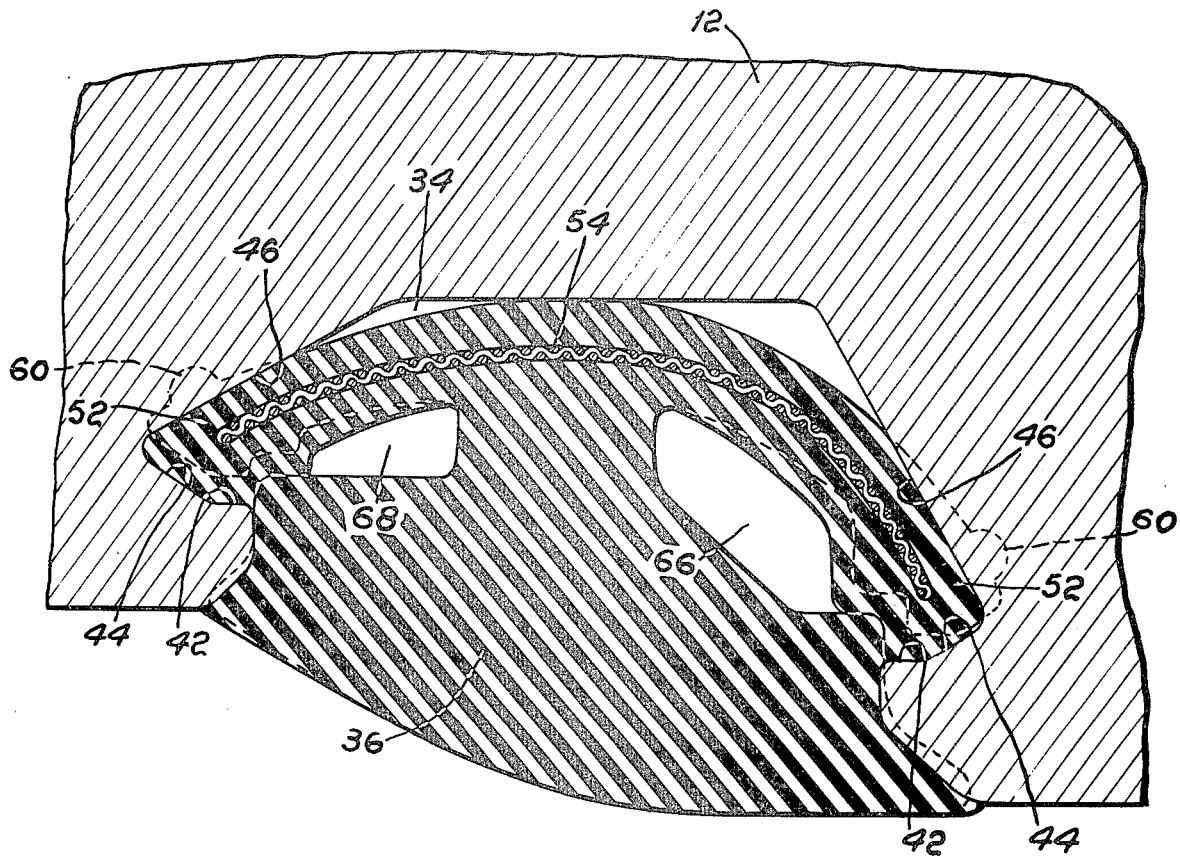
FIG. 5 is a sectional view showing the seal ring of FIG. 3 inserted in the groove of FIG. 2.

Referring to FIG. 5, there is shown how the seal ring 36 is inserted into the annular groove 34. The uncompressed shape of the seal ring is shown in dotted lines to indicate points of contrast and compression. The arms 52 are pressed outwardly under the influence of spring member 54 to create a seal between the sealing beads 60 and the inner converging surfaces 46. The ends of the arms 52 engage both the diverging surfaces 44 of the groove and the cylindrical surfaces 42 to retain the seal ring in said groove. The stepped portions 56 and 58 are pressed together to form additional sealing surfaces between the ring portions. The sides of the seal ring are compressed between the pairs of converging surfaces 38 and parallel surfaces 40 to provide a compression seal therebetween.

When the stepped portions 56 and 58 are sealed together, enclosed spaces 66 and 68 are formed as shown in FIG. 5. Pressurized fluid that may leak past the compression seals at surfaces 38 and 40 will most likely work into spaces 66 and 68 so that additional sealing force will be exerted on arms 52 to enhance the seal formed by heads 60 against surfaces 46.

Thus, it is apparent how the present invention provides a self-retaining seal ring since the arms 52 extend outwardly under the influence of the spring member 54 so as to engage the dove-tailed portion of the groove and retain the seal ring in place. In like manner, the spring member urges arms 52 and sealing beads 60 against surfaces 46 to provide a self-sealing arrangement said seal being enhanced by any fluid leakage into spaces 66 and 68.

Referring to FIG. 6, there is shown a second embodiment of the present invention wherein the surfaces defining the annular groove 34 are shaped somewhat differently than those shown in FIG. 2 but still contain a dove-tailed portion formed by diverging surfaces 44 and cylindrical surfaces 42 in a manner similar to that of FIG. 3. Annular sealing ring 36 is adapted to fit into annular groove 34 and has a curved sealing surface 50 and arms 52 extending from the narrowest portion of the seal ring. Arms 52 are bent towards the sealing surface 50 as shown in FIG. 6. The arms terminate in sealing beads 60 and include a V-shaped grooves 70, the purpose of which will be discussed subsequently. A metallic spring member 54 is embedded in said seal ring and extends into the arms 52 as shown. The annular seal ring 36 is inserted into the annular groove 34 and is self-retaining and self-sealing. When the seal ring is inserted into the groove, the spring member 54 urges the arms in an axial direction so that the ends of the arms 52 engage the dove-tailed portion formed by surfaces 42 and 44 thereby retaining the seal member in said groove. The sealing bead 60 is compressed against surfaces 46 and the dove-tailed portion to provide a seal therebetween and render the seal ring self-sealing. The back side of the seal ring engages surfaces 48 to provide a seal therebetween while the V-shaped grooves 70 contacts the rounded corner between surfaces 40 and 42 to prevent leakage behind the sealing beads 60 in the event of water pressure surges. Pressurized water will probably leak into spaces 66 and 68; however, this pressure will exert a force on arms 52 thereby increasing the sealing pressure on beads 60.

Thus, it is apparent that the present invention provides a self-retaining and self-sealing seal ring for a pivot type valve that may be replaced in the field with little difficulty. The seal ring may be easily snapped in place in the annular groove of the valve body and is retained therein without the requirement for additional retaining members as required in the prior art. Since the seal ring is not bonded to the valve body, removal is less difficult than that experienced with the seal rings of the prior art. It is apparent that during removal, the seal ring will be destroyed since the spring member will in all likelihood be bent out of shape; however, the destruction of a worned seal ring does not present a problem since it is to be discarded anyway.

What is claimed is:

1. A valve, comprising:
   a body having a passage extending therethrough;
   a closing means moveably mounted in said body and including a closing member disposed in said passage for opening and closing said passage, said body and said closing member each having opposed surfaces when the closing member is closing said passage;
   a groove formed in one of said opposed surfaces, said groove being defined by surfaces that are formed and arranged to have an inner groove portion that is wider than an outer groove portion;
   seal means formed of resilient material disposed in said groove for providing a seal between the opposed surfaces, said seal means including at least one axially extending arm; and
   a spring member embedded in said seal means and extending into said arm for urging said arm in an axial direction away from said seal means into sealing engagement with the surfaces defining the wider inner groove portion and into an interference fit with the surfaces defining the narrower outer groove portion for retaining the seal means within said groove, whereby installation of the seal means into the groove is facilitated by the arm and spring means which may bend as they pass the outer groove portion and thereafter return to engage the inner groove portion and provide the interference fit.

2. A valve member as described in claim 1, additionally comprising a compressible sealing bead formed on said arm.

3. A valve member as described in claim 1, wherein said groove includes a dove-tailed portion between the inner and outer portion, said dove-tailed portion being engaged by the arm to retain the seal means in said groove.

4. A valve as described in claim 1, wherein the seal means includes a pair of arms extending from opposite sides of the seal means, said arms being urged towards each other during insertion into the groove and thereafter spreading apart to engage the surfaces defining the outer portion of the groove.

5. A valve as described in claim 1, wherein the spring member is a sheet of spring material.

6. A valve as described in claim 1, wherein the spring member comprises a length of wire folded across the seal means and a cord woven between the folds of the wire to maintain a desired configuration of the folded wire.

7. A valve as described in claim 1, wherein the end of the arm engages the seal means thereby defining a space for trapping pressurized fluid that leaks past the seal means so that said pressurized fluid exerts a sealing force on said arm.

8. A valve as described in claim 1, wherein said seal means engages the surfaces of the groove defining the outer portion of the groove and the arms engage the surfaces of the groove defining the inner portion thereby defining a space for trapping pressurized fluid that leaks past the seal means so that said pressurized fluid exerts a sealing force on said arm.

9. A valve as described in claim 1, wherein the surfaces of the groove define a shoulder between the inner and outer portions and the arm includes a V-shaped groove for engaging the shoulder and forming a seal therebetween to prevent leakage past said arm during pressure surges.

10. A valve as described in claim 1, wherein the seal means has an intermediate portion between the inner and outer portion that is narrower than the outer portion and includes a shoulder which is engaged by a step formed in the arm when inserted into the groove thereby defining a space for trapping pressurized fluid that leaks past the seal means so that said pressurized fluid exerts a sealing force on said arm.

11. A valve as described in claim 1, wherein the passage has a generally cylindrical shape and the opposed surfaces are annular.

12. A valve as described in claim 11, wherein the groove and seal means are annular.

13. A valve as described in claim 12, wherein the seal means is formed of extruded material cut to a desired length and having the ends connected to form the annular seal means.

14. A valve as described in claim 1, in which said spring member has a curved cross sectional shape with at least one edge thereof being directed towards the other of said opposed surfaces.

15. A valve as described in claim 1, wherein the spring member has a cross sectional shape that is essentially straight with at least one end bent towards the other of said opposed surfaces.

* * * * *